(12) United States Patent
Rostami

(10) Patent No.: US 9,039,443 B2
(45) Date of Patent: *May 26, 2015

(54) APPARATUS AND METHODS FOR PROVIDING POWER AND COMMUNICATING DATA WITH ELECTRONIC DEVICES

(71) Applicant: Ramin Rostami, Calabasas, CA (US)

(72) Inventor: Ramin Rostami, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,010

(22) Filed: Jun. 2, 2014

(65) Prior Publication Data

US 2014/0287617 A1    Sep. 25, 2014

Related U.S. Application Data

(63) Continuation of application No. 13/351,590, filed on Jan. 17, 2012, now Pat. No. 8,740,641.

(51) Int. Cl.
*H01R 11/00* (2006.01)
*H01R 24/28* (2011.01)
*H01R 13/66* (2006.01)
*H01R 31/02* (2006.01)
*H02J 7/00* (2006.01)

(52) U.S. Cl.
CPC ............ *H01R 24/28* (2013.01); *H01R 13/6675* (2013.01); *H01R 31/02* (2013.01); *H02J 7/0042* (2013.01)

(58) Field of Classification Search
CPC ....................................................... H01R 31/06
USPC ......................................... 439/502, 660, 190
See application file for complete search history.

(56) References Cited

U.S. PATENT DOCUMENTS

| | | | |
|---|---|---|---|
| RE28,499 E * | 7/1975 | Flentge | 336/92 |
| 7,252,542 B2 * | 8/2007 | Chen | 439/502 |
| 8,740,641 B2 * | 6/2014 | Rostami | 439/502 |
| 2007/0270026 A1 * | 11/2007 | Lo | 439/499 |

* cited by examiner

*Primary Examiner* — Phuong Dinh
(74) *Attorney, Agent, or Firm* — Merle W Richman, Esq.

(57) ABSTRACT

Embodiments of a system, topology, and architecture for providing power and transceiving data to electronic devices having an interface are described generally herein. Other embodiments may be described and claimed.

20 Claims, 8 Drawing Sheets

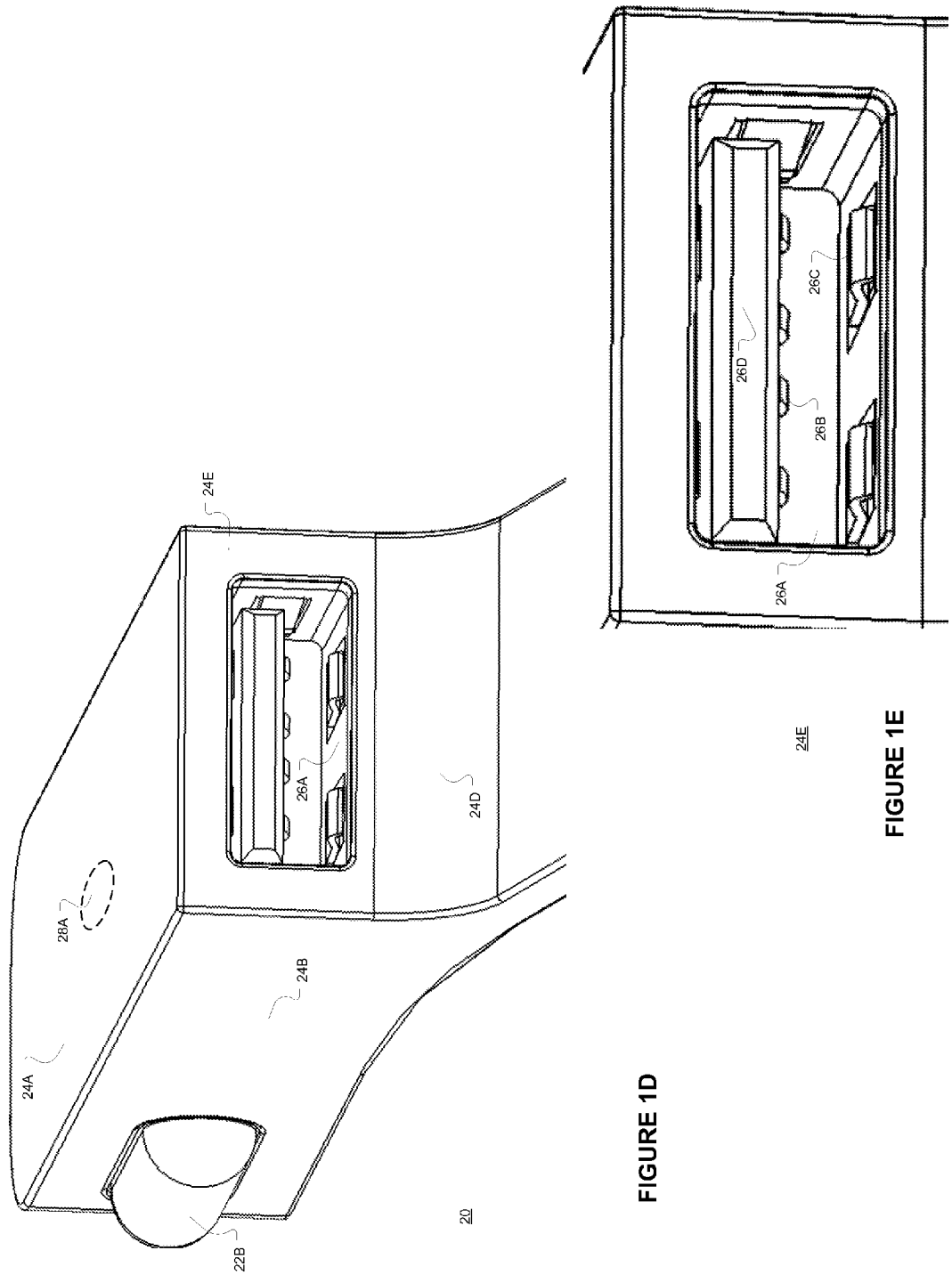

APPARATUS AND METHODS FOR PROVIDING POWER AND COMMUNICATING DATA WITH ELECTRONIC DEVICES

CROSS REFERENCE TO RELATED APPLICATIONS

The present application claims priority under 35 USC section 120 as a Continuation of application Ser. No. 13/351,590, entitled "APPARATUS AND METHODS FOR PROVIDING POWER AND COMMUNICATING DATA WITH ELECTRONIC DEVICES", and filed on Jan. 17, 2012, the application is considered as being part of the disclosure of the accompanying application and is hereby incorporated herein by reference.

TECHNICAL FIELD

Various embodiments described herein relate to apparatus and methods for providing electrical power and communicating data to electronic devices.

BACKGROUND INFORMATION

It may be desirable to provide power or data to one or more electronic devices. The present invention includes such a device.

BRIEF DESCRIPTION OF THE DRAWINGS

FIG. 1D is a simplified back view diagram of an ED DCPSA combined external PC and ED DPI module according to various embodiments.

FIG. 1E is a simplified view diagram of an ED DCPSA ED DPI according to various embodiments.

DETAILED DESCRIPTION

Figure 1A:
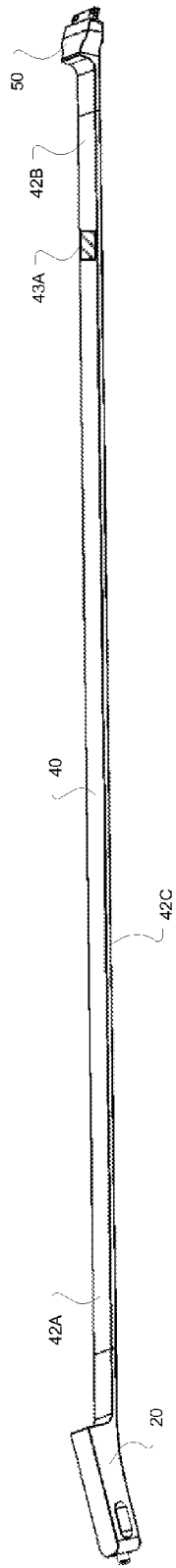
FIG. 1A is a simplified isometric view diagram of an electronic device ("ED") data communication and power supply apparatus (DCPSA) according to various embodiments.
Figure 2A:
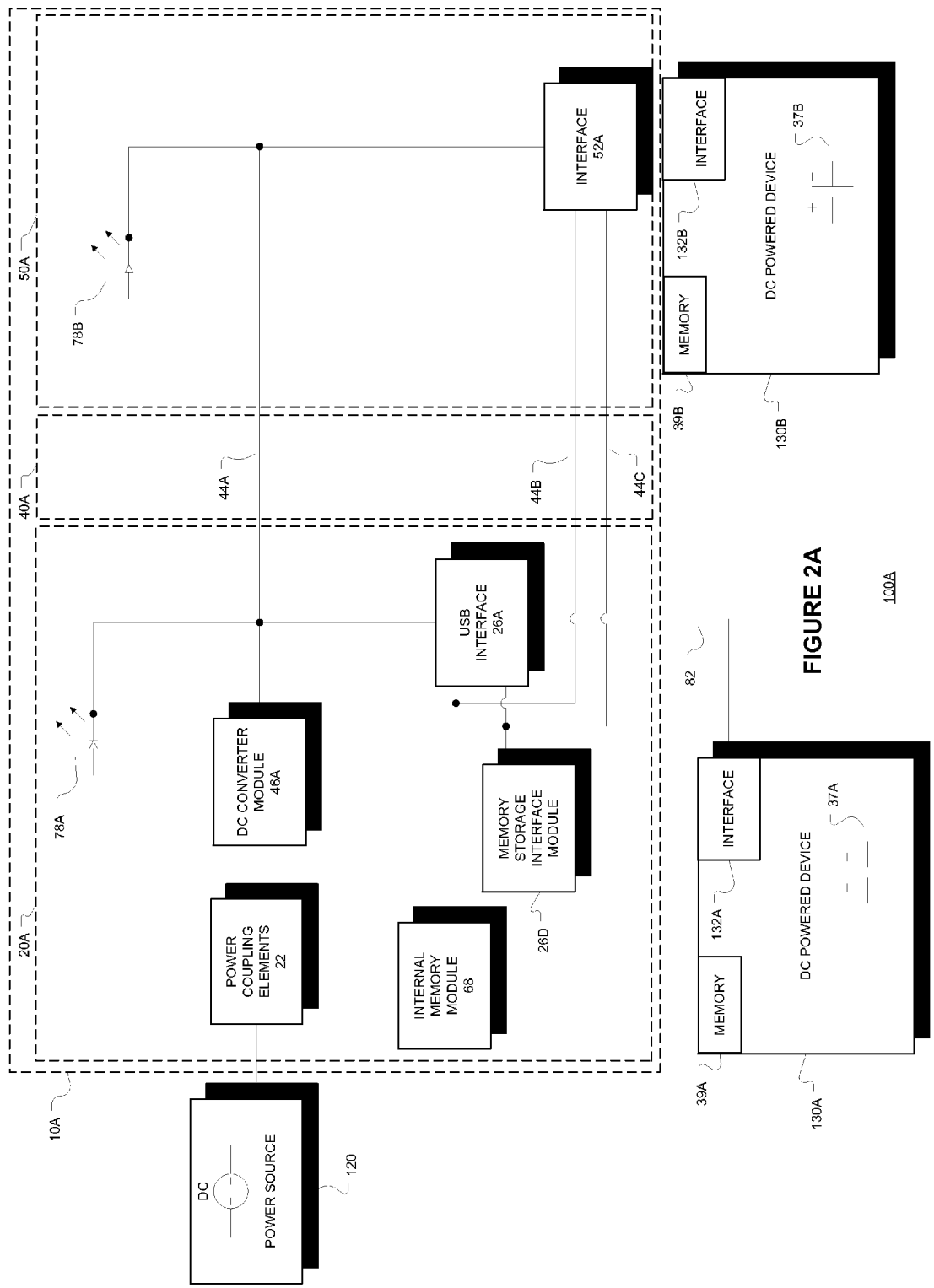
FIG. 2A is a block diagram of an architecture including an ED DCPSA coupled to a first ED, a second ED, and an external power source ("PS") according to various embodiments.

FIG. 1A is a simplified isometric view diagram of an electronic device ("ED") (130A, 130B, FIGS. 2A, 2C and 130C, FIGS. 2B, 2D) data communication and power supply apparatus (DCPSA) 10A according to various embodiments. The DCPSA 10A may include a combined external power coupling ("PC") and ED data and power interface ("DPI") module 20, a substantially flat cable module 40, and a second ED DPI module 50. The substantially flat cable module 40 may physically and electrically couple the combined external PC and ED DPI module 20 and the second ED DPI module 50. The combined external PC and ED DPI module 20 may enable the DCPSA 10A to couple to an external power source (120 in FIGS. 2A to 2D) and to a first ED (130A in FIGS. 2A to 2D) via a coupling cable 82. The second ED DPI module 50 may enable the DCPSA 10A to simultaneously or separately couple to a second ED 130B (FIG. 2A, 2C).

The combined external PC and ED DPI module 20 may provide power (via the external power coupling) and communicate data via internal memory ("IMM") 68 (FIG. 2A) or memory storage interface module ("MSIM") 26D to an ED 130A via the ED DPI (26A, FIG. 1D). The ED DPI of the combined external PC and ED DPI module 20 may include a female electrical interface 26A where an electrical cable 82 having a mating male connector and ED connector may electrically couple the DCPSA 10A to a first ED 130A. The second ED DPI module 50 may provide power (via the cable module 40 and module 20) and communicate data via the cable module 40 and module 20 IMM 68 or MSIM 26D to another ED 130B. The second ED DPI 50 may include a male electrical interface 52A where an ED 130B may have mating female connector to enable the DCPSA 10A to electrically couple to a second ED 130B via the second ED DPI module 50.

The substantially flat cable module 40 may include an extended middle section 42C, first end 42A, and second end 42B. The cable module 40 first end 42A may be physically and electrically coupled to the combined external PC and ED DPI module 20. The cable module 40 second end 42B may be physically and electrically coupled to the second ED DPI module 20. The cable module 40 may have a length of about 4 inches to 36 inches and be substantially flat. The cable module 40 may have width of about 10 mm to 25 mm and about 17 mm in an embodiment. The cable module 40 may have a height of about 1.0 mm to 3.5 mm and about 2.5 mm in an embodiment. The cable module 40 may include a plurality of wires coupling the combined external PC and ED DPI module 20 to the second ED DPI module 50.

The cable module 40 plurality of wires may include one power supply wire pair (44A) (FIG. 2A, FIG. 2C) and two data communication wire pairs 44B, 44C (FIG. 2A) in an embodiment. In another embodiment the cable module 40 may include a single power supply wire pair (44A) (FIG. 2C), a single power supply wire pair 44A and a single data communication wire pair 44B, 44C, or one or more power supply wire pairs 44A and one or more data communication wire pairs 44B, 44C. The cable module 40 may be physically covered by a flexible material including a polymer, plastic, silicon, rubber, or other flexible, substantially non-conductive material. The same material may cover a portion of the combined external PC and ED DPI module 20 and second ED PDI module 50 (60 FIG. 1H).

The flexible cable module 40 may further include a cable storage linking element 43A. The linking element 43A may be include material that securely and releasably mates with another linking element 43B (such as show in bottom 54E of second ED DPI module 50 and 60 of FIG. 1G and FIG. 1J). The linking element 43A may be a magnetic strip, Velcro® material, or other securably, releasably matable material where the linking element 43B may be a complementary material including a complementary magnetic strip (opposite polarity) or Velcro® material in an embodiment to enable wrapping of cable module 40 about the combined external PC and ED DPU module 20 where the second ED DPI module 50, 60 releasably locks to the cable module 40.

Figure 1C:
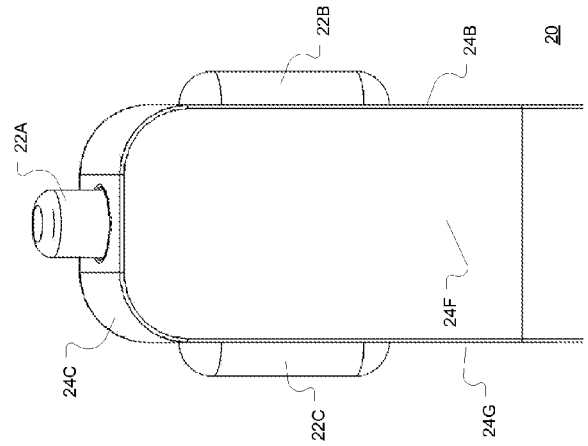
FIG. 1C is a simplified bottom view diagram of an ED DCPSA combined external PC and ED DPI module according to various embodiments.
Figure 1B:
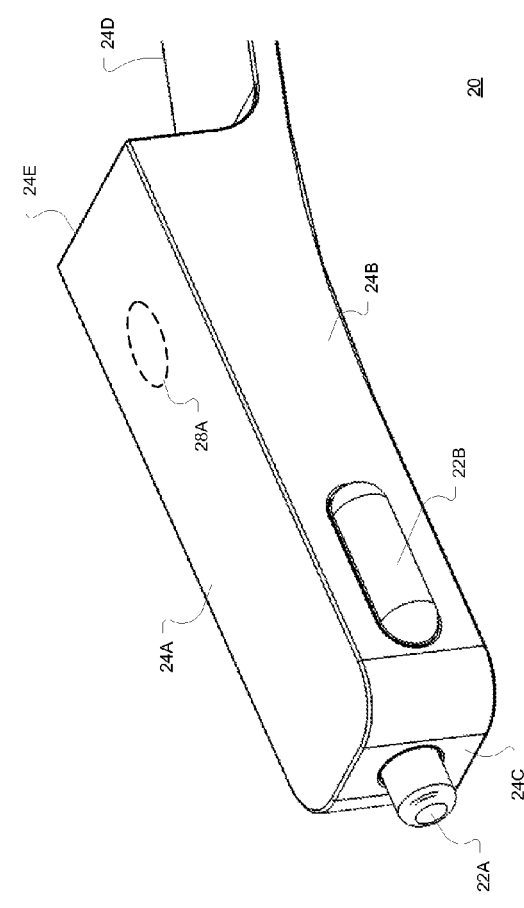
FIG. 1B is a simplified isometric view diagram of an ED DCPSA combined external power coupling ("PC") and ED data and power interface ("DPI") module according to various embodiments.

FIG. 1B is a simplified isometric view diagram of an ED DCPSA 10A combined external PC and first ED DPI 20 module according to various embodiments. FIG. 1C is a simplified bottom view diagram of an ED DCPSA 10A combined external PC and ED DPI module 20 according to various embodiments. As shown in FIGS. 1B, 1C the combined external PC and ED DPI module 20 may have a top section 24A, side sections 24B, 24G, front section 24C, rear section 24E, and back flat section 24D adjacent the cable module 40 first end 42A. In an embodiment the combined external PC and ED DPI module 20 may be configured to couple to a female external direct current ("DC") power source. Further the female external DC power source may be a DC accessory or "cigarette lighter" DC power source. The module 20 may have a width of about 15 to 20 mm or about 17 mm in an embodiment and a height of about 5 to 13 mm or about 11 mm in an embodiment at the tip 24C and about 8 to 17 mm or about 15 mm at the rear section 24E. The module 20 may have a rectangular shape to enable a user securely hold and deploy the module 20 in an external DC power source 120.

The module 20 may include two side restorably deformable 22B, 22C electrical contacts configured to couple with a first polarity of a DC signal (from the DC power source 120) and a restorably deformable tip 22A configured to couple with a second polarity of a DC signal. In an embodiment the first polarity may be a negative polarity (for the electrical contacts 22B, 22C) and the second polarity may be a positive polarity (for the electrical contact 22A). The combined external PC and ED DPI module 20 may also include a power and data status indicator 28A.

The power and data status indicator 28A may include a user detectable generation device such a light generation device or module (78A, FIG. 2A to 2D). In an embodiment the light generation device or module 28A may generate a first color or intensity to indicate the presence of power on the electrical contacts 22B, 22C and opposite polarity contact 22A. In an embodiment the light generation device or module 28A may generate a different, second color or intensity to indicate data communicated between a first ED 130A coupled to the module 20 via a cable 82 and the ED DPI 26A.

FIG. 1D is a simplified back 24E view diagram of an ED DCPSA 10A combined external PC and ED DPI module 20 according to various embodiments. FIG. 1E is a simplified diagram of an ED DCPSA 10A first ED DPI 26A according to various embodiments. As shown in FIGS. 1D and 1E the first ED DPI 26A includes a plurality of electrical contacts B, a combination registration and memory slot tab 26D, and releasably deformable physical deformable contacts 26C. As shown in FIGS. 1D and 1E the DPI 26A may be a female type electrical connector. In an embodiment the first ED DPI 26A may a female type universal serial bus connector including a USB 1.0, 2.0, 3.0, mini A/B, or micro A/B. The DPI 26A may include from 4 to 8 connectors where a pair may be a power pair and 2 to 6 connectors may be data wires.

The PC electrical connectors 22A and 22B/C may be configured to receive a power signal having a voltage level from 3 to 24 volts and about 12 volts nominally. The DPI 26A power connectors (number 1 and 4 for a USB 1.0, 2.0 interface and 1 and 5 for a mini or micro USB interface) may provide a power signal having a voltage level from 3 to 6 volts and about 4.75 to 5.25 volts nominally. The power signal may a current level from about 100 mA to 1.5 A. The first ED DPI 26A may have an opening of about 11.5 mm (width) by 4.5 mm (height) for a standard USB female connector, about 7 mm (width) by 3 mm (height) for a mini A/B USB female connector, and about 7 mm (width) by 1.5 mm (height) for a micro A/B USB female connector.

In an embodiment the combined external PC and ED DPI module 20 may include a DC converter module 46A (FIGS. 2A to 2D). The DC converter module 46A may be electrically coupled to the PC contacts 22A and 22B/C and the electrical contact power pair 26C of the ED DPI 26A. In an embodiment the DC converter module 46A may be any device or combination of devices that may convert an input power signal to an output signal having a power level at or about the level required for the first ED DPI 26A and the second ED DPI 52A.

In an embodiment the DC converter module 46A may include a transformer, step-down converter, or DC to DC converter including a buck converter. In an embodiment the DC converter may include a TI® chip LNM2825. The module 20 may also include an internal memory module 68 and a memory storage interface module 26D (as part of the USB registration tab in an embodiment). The USB interface 26A may be electrically coupled to the IMM 68 and MSIM 26D data connectors 26B.

Figure 1F:
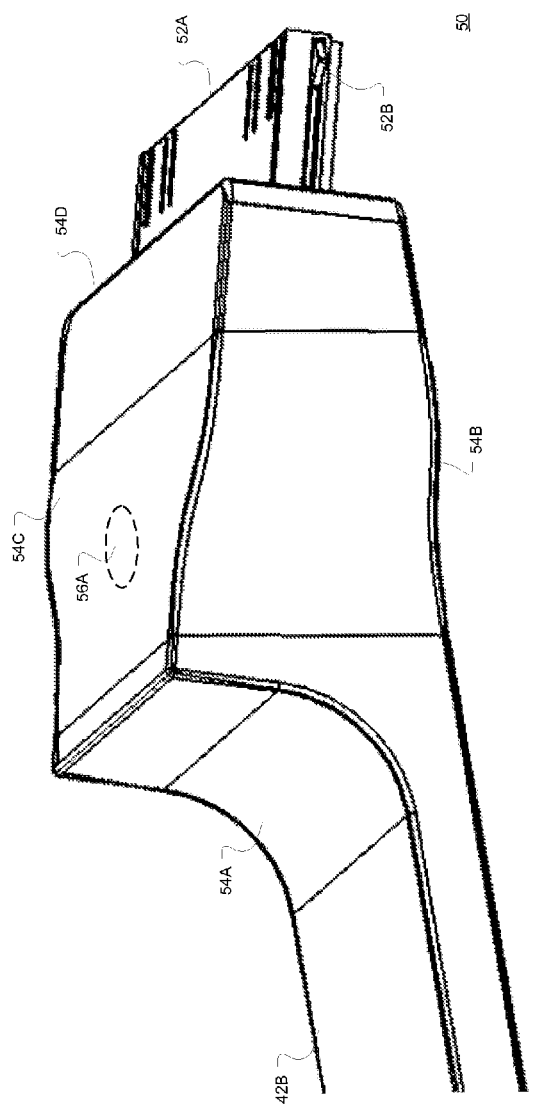
FIG. 1F is a simplified isometric view diagram of an ED DCPSA second ED DPI module according to various embodiments.
Figure 1G:
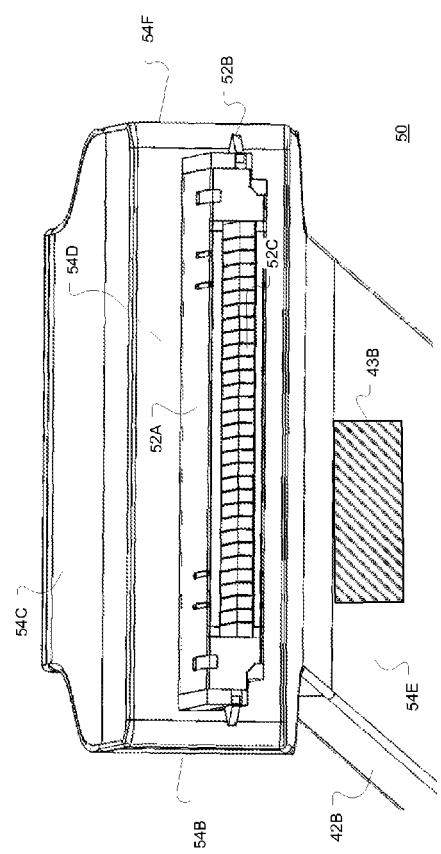
FIG. 1G is a simplified front view diagram of an ED DCPSA second ED DPI module according to various embodiments.

FIG. 1F is a simplified isometric view diagram of an ED DCPSA 10A second ED DPI module 50 according to various embodiments. FIG. 1G is a simplified front view diagram of an ED DCPSA 10A second ED DPI module 50 according to various embodiments. As shown in FIGS. 1F and 1G, the second ED DPI module 50 may include a top section 54C, a first and second side 54B, 54F, a bottom section 54E, and a rear section 54A coupled to the cable module 40 second end 42B. The second ED DPI module 50 may also a user detectable signal generation module 56A and DPI 52A.

In an embodiment the DPI 52A may include one or more restorably deflectable tabs 52B and a plurality of electrical connectors 52C. In an embodiment the ED DPI module 50 may be an ED specific interface including a 30-pin Apple® connector or portable digital media interface (PDMI). For an Apple® 30-pin connector power may be communicated on pins 23 (+) and 16 (gnd) and data on pins 25 (data +) and 23 (data −). In an embodiment the ED DPI module 50 may be a male electrical connector that may be directly coupled to a reciprocal electrical connector (female Apple® or PDMI connector in an embodiment).

The power and data status indicator 56A may include a user detectable generation device such a light generation device or module (78B, FIG. 2A to 2D). In an embodiment the light generation device or module 56A may generate a first color or intensity to indicate the presence of power on the electrical contacts 22B, 22C and opposite polarity contact 22A. In an embodiment the light generation device or module 56A may generate a different, second color or intensity to indicate data communicated between a second ED 130B coupled directly to the ED DPI module 50. In an embodiment the ED DPI 52A may be retractable within the module 50 front wall 54D to protect the ED DPI 52A when not in use.

In an embodiment the user detectable element or generation module 28A, 56A, 66A (FIG. 1I) may emit light, sound, vibration, or a combination thereof. In an embodiment, the modules 78A, 78B (FIGS. 2A to 2D) may include at least one light emitting diode (LED). In an embodiment the MSIM 26D may receive and communicate with one or more memory storage elements including a compact flash card, secure digital (SD), miniSD, microSD, SD high capacity (SDHC), miniSDHC, microSDHC, SD extended capacity, and memory stick. The MSIM 26D may also conform to the SD input-output (SDIO) standard to enable memory card and other devices to communicate with and through ED DCPSA 10A, 10B and an ED 130A, 130B, 130C. The other devices may include a Bluetooth interface and broadband data interface.

Figure 1H:
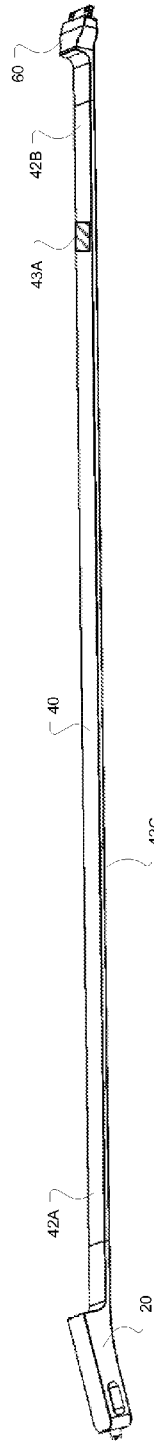
FIG. 1H is a simplified isometric view diagram of another electronic device ("ED") data communication and power supply apparatus (DCPSA) according to various embodiments.
Figure 1I:
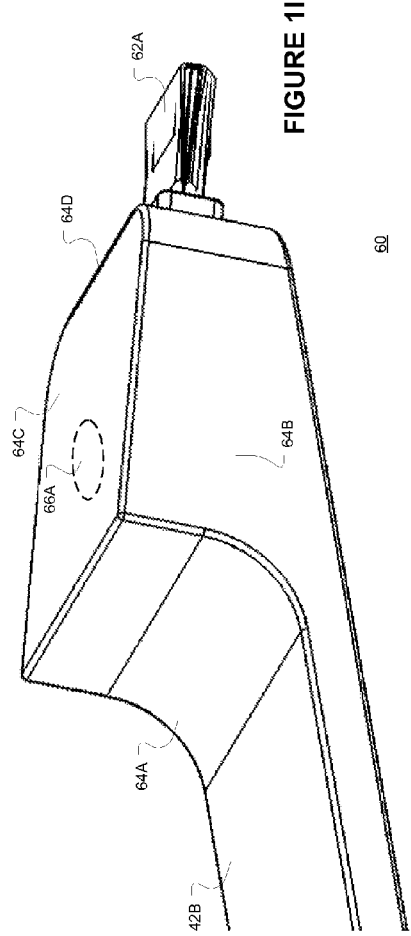
FIG. 1I is a simplified isometric view diagram of an ED DCPSA second ED DPI module according to various embodiments.
Figure 1J:
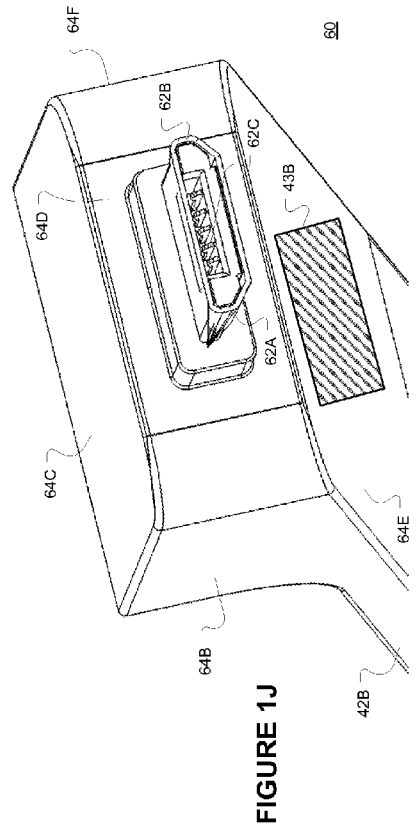
FIG. 1J is a simplified front view diagram of an ED DCPSA second ED DPI module according to various embodiments.

FIG. 1H is a simplified isometric view diagram of another electronic device ("ED") data communication and power supply apparatus ("DCPSA") 10B according to various embodiments. FIG. 1I is a simplified isometric view diagram of another ED DCPSA second ED DPI module 60 according to various embodiments. FIG. 1J is a simplified front view diagram of another ED DCPSA second ED DPI module 60 according to various embodiments. As shown in FIGS. 1H-1J the other, second ED DPI module 60 may include a top section 64C, a first and second side 64B, 64F, a bottom section 64E, and a rear section 64A coupled to the cable module 40 second end 42B. The other second ED DPI module 60 may also a user detectable signal generation module 66A and DPI 62A.

In an embodiment the DPI 62A may include an outer casing 62B and a plurality of electrical connectors 62C. In an embodiment the ED DPI module 60 may be a generic interface usable by multiple ED 130C. In an embodiment the ED DPI module 60 may be a USB interface including a standard USB, mini A/B, or micro A/B. The ED DPI module 60 may be a male electrical connector that may be directly coupled to a reciprocal electrical connector (female USB connector in an embodiment).

FIG. 2A is a block diagram of an ED DCPSA architecture 100A including an external DC power source 120, an ED DCPSA 10A, a chargeable or powerable ED 130A, and a second ED 130B according to various embodiments. The ED DCPSA 10A may be coupled to the external DC power source 120. A first DC powered ED 130A may be coupled to the ED DCPSA 10A via an electrical cable 82. A second DC powered ED may be directly coupled to the ED DCPSA 10A. The ED DCPSA 10A may include a combined external PC and ED DPI module 20A, a cable module 40A, and a second ED DPI module 50A. The combined external PC and ED DPI module 20A may be coupled to the second ED DPI module 50A via the cable module 40A. The first DC powered ED 130A may be coupled to the combined external PC and ED DPI module 20A USB module 26A via an electrical cable 82. The electrical cable 82 may include a USB connector on a first end to electrically and physically couple to the USB interface 26A. The electrical cable 82 may include a second connector on a second end to electrically and physically couple to the DC powered ED interface 132A. The DC powered ED interface 132A may be device specific or a USB interface in an embodiment.

The second DC powered ED 130B may be directly coupled to the second ED DPI module 50A interface 52A. The DC powered ED 130B interface 132B may have a complementary electrical and physical configuration to the electrical and physical configuration of the interface 52A. In an embodiment, the ED DPI module 50A interface 52A may include a male electrical connector and the DC powered ED 130B interface 132B may include a female electrical connector. In an embodiment the interfaces 52A, 132B may be reciprocal device specific interfaces such as an Apple ® or other 30 pin interface (52A, FIG. 1F). In a further embodiment the interfaces (62A FIG. 1I), (132C, FIGS. 2B, 2D) may be reciprocal USB interfaces.

The combined external PC and ED DPI module 20A may include power coupling elements 22, a DC converter module 46A, an internal memory module (IMM) 68, a memory storage interface module (MSIM) 26D, an USB interface 26A, and a LED module 78A. The power coupling elements 22 may couple the DC powered source 120 to the DC converter module 46A. The power coupling elements 22 may include two or more electrical contacts 22A and 22B, 22C. The DC converter module 46A may receive the DC power signal from the power coupling elements 22 and convert the DC power signal to a power signal having a voltage and amperage level required for the first DC powered ED 130A or second DC powered ED 130B. The DC converter module 46A may include a transformer or DC to DC converter. The DC converter module 46A may be coupled to the USB interface 26A and the signal generation module 78A to provide power to the USB interface 26A and a first DC powered ED 130A via the electrical cable 82.

The second ED DPI 50A may include an interface 52A and a signal generation module 78B. In an embodiment the signal generation 78B may include a one or more LED drivers 78B. The cable module 40A may include wire pairs 44A, 44B, 44C. Wire pair 44A may couple power generated by the DC converter module 46A to the interface 52A and signal generation module 78B. The wire pair 44B may couple the IMM 68 to the interface 52A. The wire pair 44C may couple the MSIM 26D to the interface 52A. The interface 52A receive the power signal and data signals and provide the power signal and communicate the data signals via the interface 52A to the second DC powered ED 130B.

In an embodiment, the DC powerable ED 130A, 130B may include a rechargeable electrical storage element 37A, 37B and memory 39A, 39B. The ED DCPSA 10A may provide electrical energy to one or more devices 130A, 130B via the USB interface 26A or interface 52A that is sufficient to a) power the ED 130A, 130B, b) charge an electrical storage element 37A, 37B of the ED 130A, 130B, and c) simultaneously power an ED 130A, 130B and charge an electrical storage element 37A, 37B, 37C (FIG. 2B, 2D) of the ED 130A, 130B, and 130C. The electrical storage element 37A, 37B may be a re-chargeable battery (including chemical and non-chemical such as NiCad, lithium-ion), capacitor, or other device capable of temporarily storing electrical energy. The ED DCPSA 10A may auto-detect the energy or power requirements of an ED 130A, 130B coupled to the USB interface 26A or interface 52A.

Data communicated between an ED 130A, 130B and ED DCPSA 10A may be stored in one or more IMM (68) or another device coupled to a MSIM 26D. As noted the MSIM 26D may enable communication with various memory storage elements and other devices that communicate with one or more known communication protocols including SDIO. In an embodiment, an ED 130A, 130B may store data in an internal data storage element or memory storage interface 39A, 39B. An ED DCPSA 10A, 10B (FIG. 2B) may passively or automatically backup all data, specific data, changed data, or specific changed data of an ED 130A, 130B, 130C to one or both of the IMM 68 and the MSIM 26D.

A user may be able to configure a ED DCPSA 10A, 10B (FIG. 2B) via a USB interface 26A, interface 52A, 62A (FIG. 2B) to passively backup data located on an ED 130A, 130B, 130C. The ED DCPSA 10A, 10B may detect the data or changes to the data and backup all data or changes of data as a function of the elected backup configuration. A user may select different backup modes including full (all data) and incremental backup (only data that has changed since the last backup). A user may also select the type of data to be copied (backed up)—such as selecting one or more of personal contacts, music, video, pictures, word documents, spreadsheets, or other specific data types. A user may also be able to configure an ED DCPSA 10A, 10B to restore backed up to a specific ED 130A, 130B, 130C.

Figure 2B:
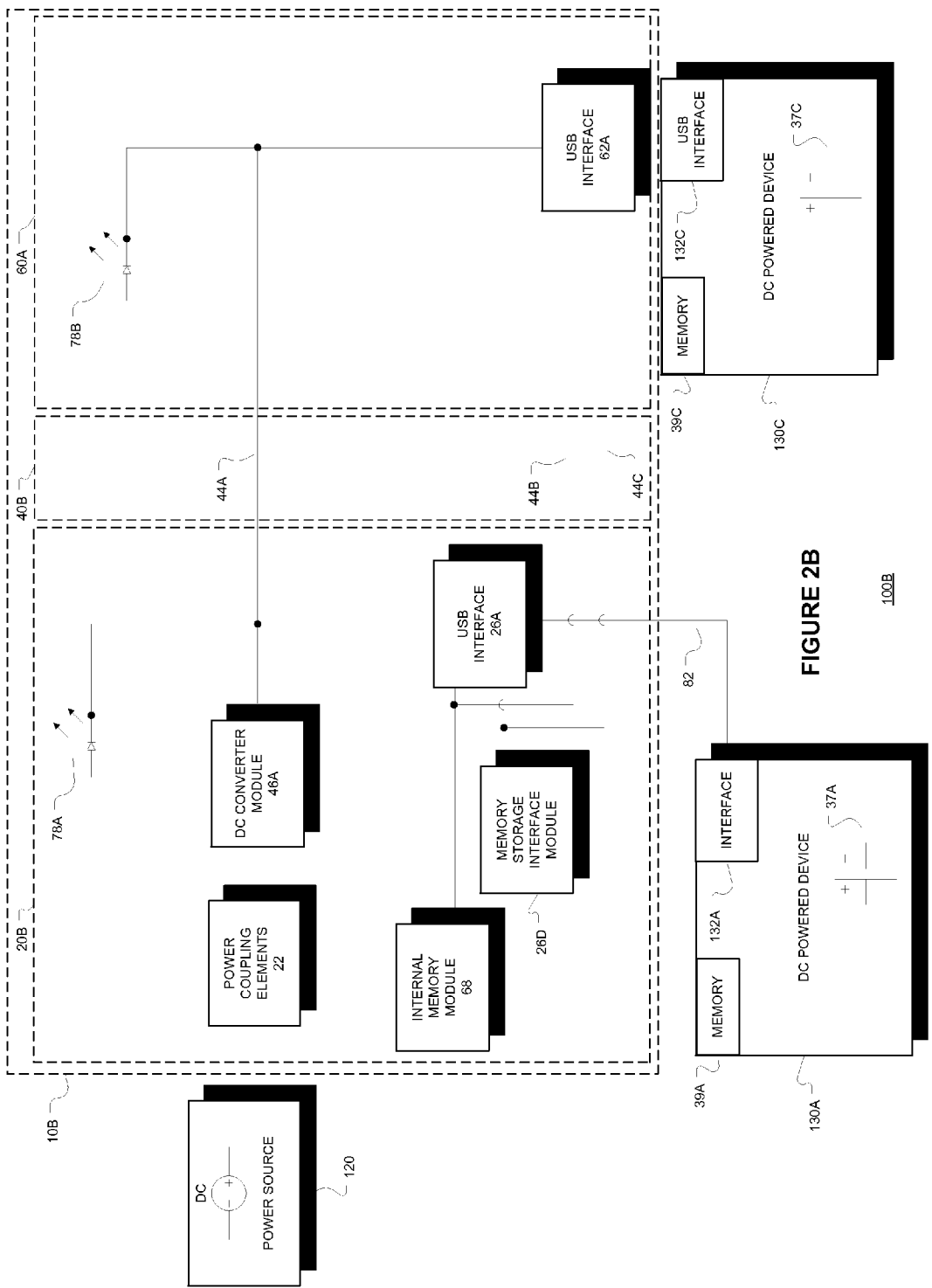
FIG. 2B is a block diagram of an architecture including an ED DCPSA coupled to a first ED, a second ED, and an external power source ("PS") according to various embodiments.
Figure 2C:
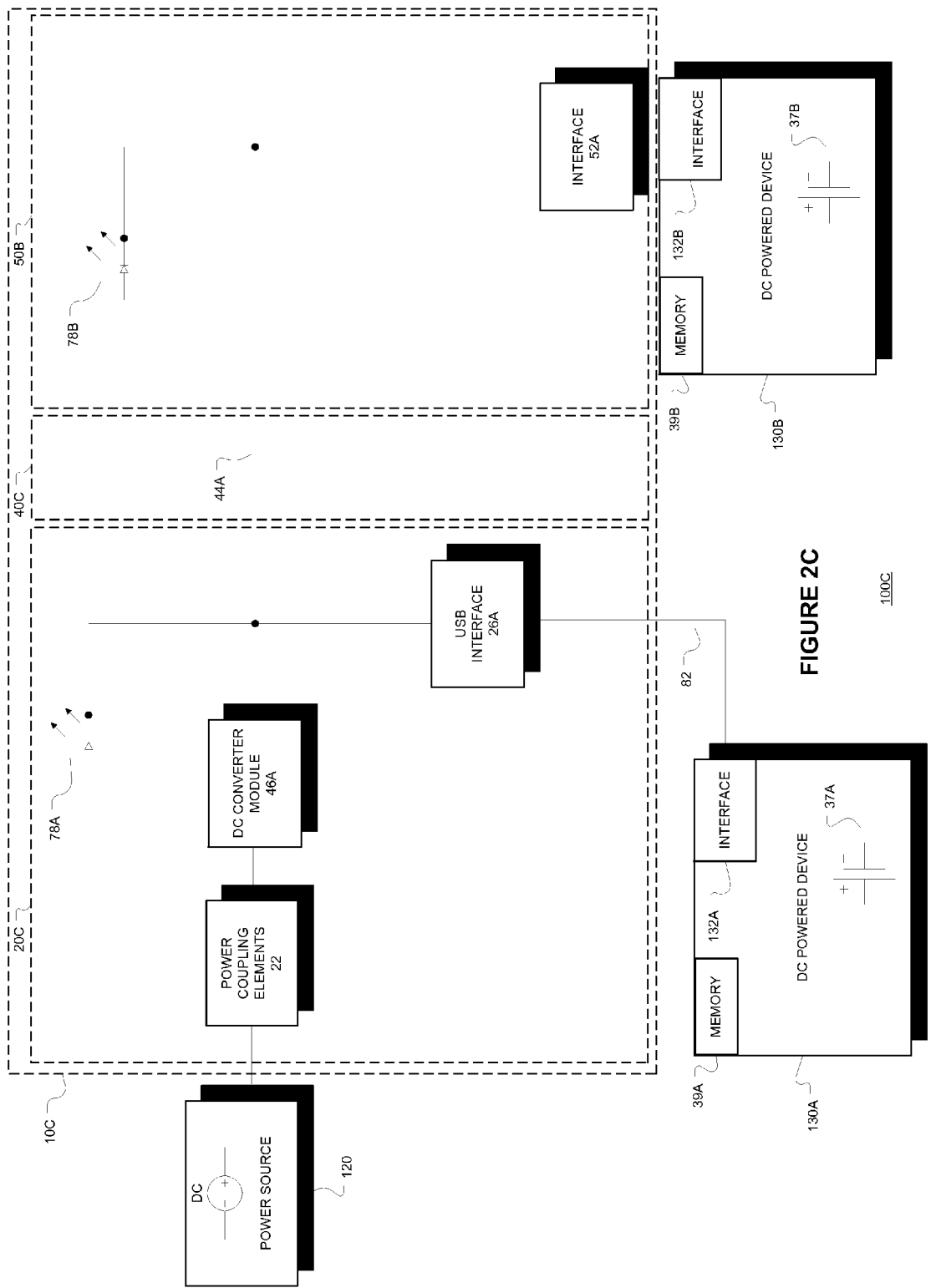
FIG. 2C is a block diagram of an architecture including an ED DCPSA coupled to a first ED, a second ED, and an external power source ("PS") according to various embodiments.

FIG. 2B is a block diagram of an ED DCPSA architecture 100B including an external DC power source 120, an ED DCPSA 10B, a chargeable or powerable ED 130A, and a second ED 130C according to various embodiments. The ED DCPSA 10B may be coupled to the external DC power source 120. A first DC powered ED 130A may be coupled to the ED DCPSA 10A via an electrical cable 82. A second DC powered ED 130C may be directly coupled to the ED DCPSA 10A via a USB interface. The ED DCPSA 10B may include a combined external PC and ED DPI module 20B, a cable module 40B, and a second ED DPI module 50B. The combined external PC and ED DPI module 20B may be coupled to the second ED DPI module 50B via the cable module 40B. The first DC powered ED 130A may be coupled to the combined external PC and ED DPI module 20B USB module 26A via an electrical cable 82.

The second DC powered ED 130C may be directly coupled to the second ED DPI module 60A interface 62A. The DC powered ED 130C interface 132C may have a complementary electrical and physical configuration to the electrical and physical configuration of the interface 62A. In an embodiment, the ED DPI module 60A interface 62A may include a male electrical connector and the DC powered ED 130C interface 132C may include a female electrical connector. In an embodiment the interfaces 62A FIG. 1I, 132C, FIGS. 2B, 2D may be reciprocal USB interfaces.

FIG. 2C is a block diagram of an ED DCPSA architecture 100C including an external DC power source 120, an ED DCPSA 10C, a chargeable or powerable ED 130A, and a second ED 130B according to various embodiments. The ED DCPSA 10C may be coupled to the external DC power source 120. A first DC powered ED 130A may be coupled to the ED DCPSA 10C via an electrical cable 82. A second DC powered ED 130B may be directly coupled to the ED DCPSA 10C via a device specific interface. The ED DCPSA 10C may include a combined external PC and ED DPI module 20C, a cable module 40C, and a second ED DPI module 50C. The combined external PC and ED DPI module 20C may be coupled to the second ED DPI module 50B via the cable module 40C. The first DC powered ED 130A may be coupled to the combined external PC and ED DPI module 20C USB module 26A via an electrical cable 82.

The second DC powered ED 130B may be directly coupled to the second ED DPI module 50B interface 52A. The DC powered ED 130B interface 132B may have a complementary electrical and physical configuration to the electrical and physical configuration of the interface 52A. In an embodiment the combined external PC and ED DPI module 20C includes the power coupling elements 22, DC converter module 46A and USB interface 26A. The cable module 40C may include a single power wire pair 44A. The single power wire pair 44A may couple the DC converter module 46A to the interface 52A second ED DPI 50B. Given the cable module 40C has a single wire pair 44A the cable module 40C height may be reduced. In an embodiment the data wire pair of the USB interface 26A may be shunted to ground. In an embodiment a DC powered ED 130A may enable fast charging when the interface 132A detects the data wire pair is shunted to ground.

Figure 2D:
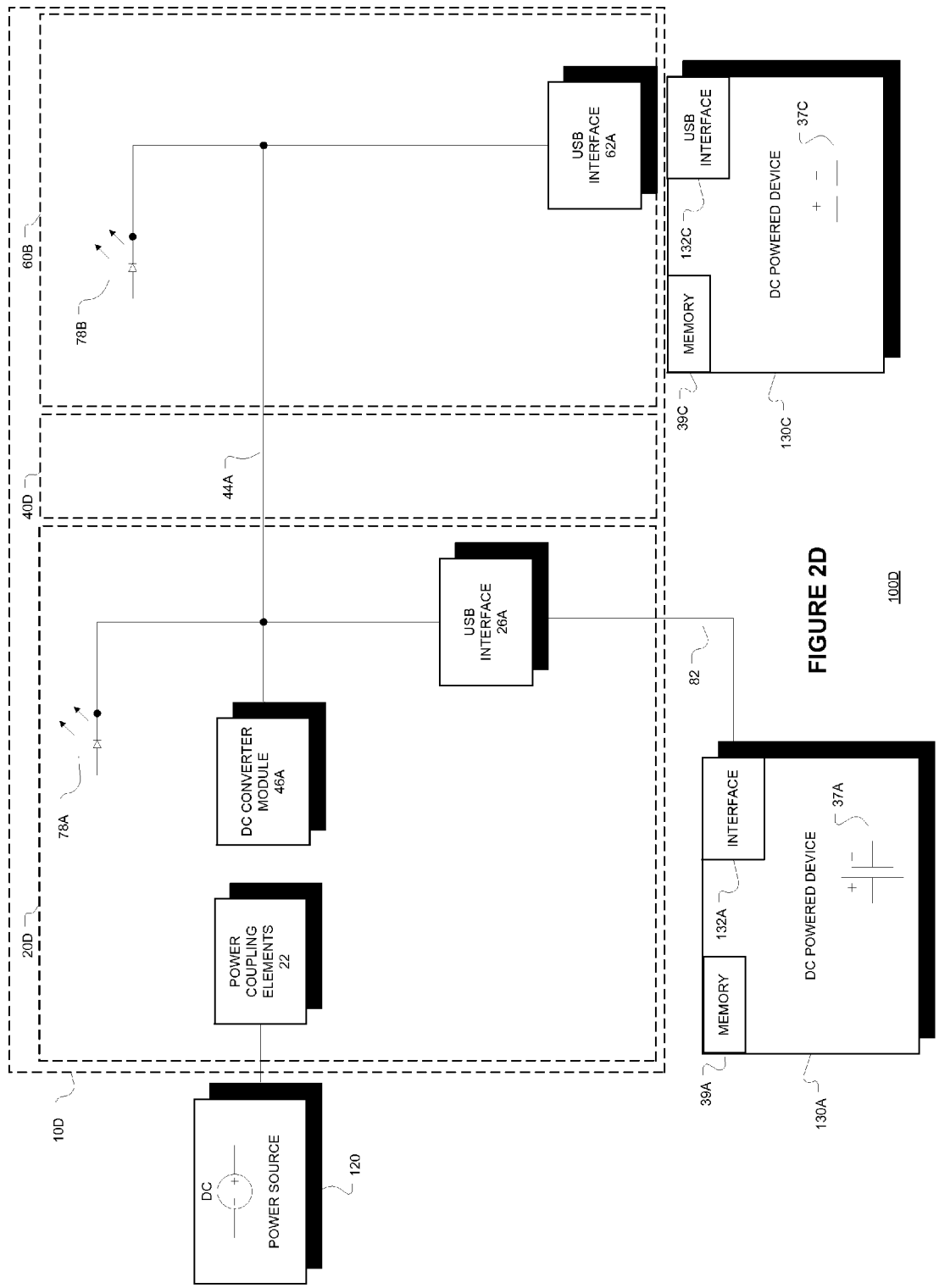
FIG. 2D is a block diagram of an architecture including an ED DCPSA coupled to a first ED, a second ED, and an external power source ("PS") according to various embodiments.

FIG. 2D is a block diagram of an ED DCPSA architecture 100D including an external DC power source 120, an ED DCPSA 10D, a chargeable or powerable ED 130A, and a second DC powered ED 130C according to various embodiments. The ED DCPSA 10D may be coupled to the external DC power source 120. A first DC powered ED 130A may be coupled to the ED DCPSA 10D via an electrical cable 82. A second DC powered ED 130C may be directly coupled to the ED DCPSA 10D via a USB interface 62A. The ED DCPSA 10D may include a combined external PC and ED DPI module 20D, a cable module 40D, and a second ED DPI module 60B. The combined external PC and ED DPI module 20D may be coupled to the second ED DPI module 60B via the cable module 40D. The first DC powered ED 130A may be coupled to the combined external PC and ED DPI module 20D USB module 26A via an electrical cable 82.

The second DC powered ED 130C may be directly coupled to the second ED DPI module 60B interface 62A. The DC powered ED 130C interface 132C may have a complementary electrical and physical configuration to the electrical and physical configuration of the interface 62A. In an embodiment the combined external PC and ED DPI module 20D includes the power coupling elements 22, DC converter module 46A and USB interface 26A. The cable module 40C may include a single power wire pair 44A. The single power wire pair 44A may couple the DC converter module 46A to the interface 62A second ED DPI 60B. Given the cable module 40C has a single wire pair 44A the cable module 40C height may be reduced. In an embodiment the data wire pair of the USB interface 26A may be shunted to ground. In an embodiment a DC powered ED 130A may enable fast charging when the interface 132A detects the data wire pair is shunted to ground.

Any of the components previously described can be implemented in a number of ways, including embodiments in software. Any of the components previously described can be implemented in a number of ways, including embodiments in software. Thus, the power coupling elements 22, the USB interface 26A, the interface 52A, and the interface 62A may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments. The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within and couplable to a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion. A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus, the following claims are hereby incorporated into the Detailed Description, with each claim standing on its own as a separate embodiment.

What is claimed is:

1. An apparatus for providing power to a portable electronic device (PED), the PED including an electrical energy storage element, including:
   a first housing, the first housing mechanically separatably from the PED, the first housing substantially including a first power interface module (PIM), the first PIM including at least two electrical contacts configured to be releasably and directly coupled with the PED, the PIM at least two electrical contacts configured to provide a direct current (DC) power signal; and
   a second housing, the second housing physically separate from the PED and coupled to the first housing via a substantially flat, flexible cable, the second housing including an external power source interface (EPSI), the (EPSI) including at least two separate electrical contacts configured to receive a DC electrical signal, and a converter module coupled to the EPSI, the converter module converting a DC signal from the EPSI having a first voltage level to a DC signal having a lower, second voltage level;
   the substantially flat, flexible cable fixably coupling the first housing to the second housing and including at least one wire pair, the wire pair coupling the first housing first PIM at least two electrical contacts to the second housing converter module to provide the DC signal having the lower, second voltage level to the first PIM at least two electrical contacts.

2. The apparatus for providing power to a PED of claim 1, further including a user perceptible signal generation module encased in one of the first housing and the second housing, the signal generation module providing an indication of a DC signal being received by the second housing EPSI at least two separate electrical contacts.

3. The apparatus for providing power to a PED of claim 1, wherein the second housing has a width and a height and the height is less than the width and the EPSI is a male type electrical interface.

4. The apparatus for providing power to a PED of claim 3, wherein the substantially flat, flexible cable has a width about equal to the width of the second housing and a height less than half of the first housing height.

5. The apparatus for providing power to a PED of claim 1, wherein the second housing further includes a second power interface module (PIM), the second PIM including at least two electrical contacts configured to be coupled to a second electronic device, the second PIM at least two electrical contacts coupled to the converter module to provide the signal having the lower, second power level to the second PIM at least two electrical contacts.

6. The apparatus for providing power to a PED of claim 1, wherein the first voltage level is about 10-13 volts, and the second voltage level is about 3-5 volts.

7. The apparatus for providing power to a PED of claim 1, wherein the second housing further includes a second, female-type power interface module (PIM), the second PIM including at least two electrical contacts configured to be indirectly coupled to a second electronic device, the second PIM at least two electrical contacts coupled to the converter module to provide the signal having the lower, second power level to the second PIM at least two electrical contacts.

8. The apparatus for providing power to a PED of claim 1, wherein the second housing, the first housing, and the cable are shaped so the cable can be coiled about the second housing and one of the cable and the cable and first housing including storage linking elements to releasably secure the cable about the second housing.

9. The apparatus for providing power to a PED of claim 1, the second housing further including an internal data storage module (DSM) and wherein the first PIM enables communication of data between the internal DSM and a coupled PED.

10. The apparatus for providing power to a PED of claim 1, the second housing further including an external memory storage interface module (EMSIM) and wherein the first PIM enables communication of data between the EMSIM and a coupled PED.

11. An apparatus for providing power to a first portable electronic device PED and a second PED, the apparatus including:
  a first housing, the first housing mechanically separatably from the PEDs, the first housing substantially including a first power interface module (PIM), the first PIM including at least two electrical contacts configured to be releasably and directly coupled with one of the first and the second PED, the PIM at least two electrical contacts configured to provide a direct current (DC) power signal;
  a second housing, the second housing physically separate from the PEDs and coupled to the first housing via a flexible cable, the second housing including an external power source interface (EPSI), the EPSI including at least two separate electrical contacts configured to receive a DC electrical signal, a converter module coupled to the EPSI, the converter module converting a DC signal from the EPSI having a first voltage level to a DC signal having a lower, second voltage level, and a second power interface module (PIM), the second PIM including a least two electrical contacts configured to be indirectly coupled with the other of the first and the second PED and coupled to the converter module to provide the DC signal having the lower, second voltage level to the second PIM at least two electrical contacts; and
  the flexible cable fixably coupling the first housing to the second housing and including at least one wire pair, the wire pair coupling the first housing first PIM at least two electrical contacts to the second housing converter module to provide the DC signal having the lower, second voltage level to the first PIM at least two electrical contacts.

12. The apparatus for providing power to a first PED and a second PED of claim 11, further including a user perceptible signal generation module encased in one of the first housing and the second housing, the signal generation module providing an indication of a DC signal being received by the second housing EPSI at least two separate electrical contacts.

13. The apparatus for providing power to a first PED and a second PED of claim 11, wherein the flexible cable is a substantially flat flexible cable.

14. The apparatus for providing power to a first PED and a second PED of claim 13, wherein the second housing has a width and a height and the height is less than the width.

15. The apparatus for providing power to a first PED and a second PED of claim 14, wherein the substantially flat cable has a width about equal to the width of the second housing and a height less than half of the first housing height and a length of at least 6 inches.

16. The apparatus for providing power to a first PED and a second PED of claim 11, wherein the other of the first and the second PED has a standardized specific power interface and the first PIM includes a mating standardized specific power interface.

17. An apparatus for providing power to a portable electronic device (PED), the PED including an electrical energy storage element, including:
  a first housing, the first housing mechanically separatably from the PED, the first housing substantially including a first power interface module (PIM), the first PIM including at least two electrical contacts configured to be releasably and directly coupled with the PED, the PIM at least two electrical contacts configured to provide a direct current (DC) power signal;
  a second housing, the second housing physically separate from the PED and coupled to the first housing via a flexible cable, the second housing including an external power source interface (EPSI), the (EPSI) including at least two separate electrical contacts configured to receive a DC electrical signal, and a converter module coupled to the EPSI, the converter module converting a DC signal from the EPSI having a first voltage level to a DC signal having a lower, second voltage level;
  the flexible cable fixably coupling the first housing to the second housing and including at least one wire pair, the wire pair coupling the first housing first PIM at least two electrical contacts to the second housing converter module to provide the DC signal having the lower, second voltage level to the first PIM at least two electrical contacts; and
  the second housing, the first housing, and the cable shaped so the cable can be coiled about the second housing and one of the cable and the cable and first housing including storage linking elements to releasably secure the cable about the second housing.

18. The apparatus for providing power to a PED of claim 17, further including a user perceptible signal generation module encased in one of the first housing and the second housing, the signal generation module providing an indication of a DC signal being received by the second housing EPSI at least two separate electrical contacts.

19. The apparatus for providing power to a PED of claim 17, wherein the second housing has a width and a height and the height is less than the width and the EPSI is a male type electrical interface.

20. The apparatus for providing power to a PED of claim 19, wherein the flexible cable is a substantially flat, flexible cable, has a width about equal to the width of the second housing, and a height less than half of the first housing height.

* * * * *